Jan. 9, 1968     D. B. SALE     3,362,546
BARGE UNLOADING DEVICE
Filed Nov. 24, 1965     4 Sheets-Sheet 1

INVENTOR.
DWIGHT B. SALE
BY
ATTORNEYS

INVENTOR.
DWIGHT B. SALE
BY
ATTORNEYS

INVENTOR.
DWIGHT B. SALE
ATTORNEYS

Jan. 9, 1968  D. B. SALE  3,362,546
BARGE UNLOADING DEVICE
Filed Nov. 24, 1965  4 Sheets-Sheet 4

INVENTOR.
DWIGHT B. SALE
BY
Flehr and Swain
ATTORNEY

United States Patent Office 3,362,546
Patented Jan. 9, 1968

3,362,546
BARGE UNLOADING DEVICE
Dwight B. Sale, San Mateo, Calif., assignor to Guy F. Atkinson Company, San Francisco, Calif., a corporation of Nevada
Filed Nov. 24, 1965, Ser. No. 509,509
7 Claims. (Cl. 214—14)

ABSTRACT OF THE DISCLOSURE

Barge unloading apparatus which includes a truss supported on two pontoons. The truss straddles a barge to be unloaded. A bucket wheel is supported on a carriage for vertical movement within the truss and when unloading the carriage and wheel is lowered into engagement with the barge which partially supports its weight. The remainder of the weight is supported by counterweights in the truss itself. The carriage includes a pair of rubber tired wheels which engage channels on the barge allowing the carriage to move along the deck of the barge to unload it. The carriage moves with the barge as it buoys upwardly during unloading and also the carriage will tilt and roll with the barge.

---

This invention relates generally to a material hauling and handling system and more particularly to a barge unloading device.

Barges have been used to haul material such as coal, fill, aggregate and the like because water transportation is, in general, more economical than rail or highway. The unloading of barges presents a unique and difficult problem. Several of the ways which have been employed for barge unloading are by means of clam shells which are lowered into the barge from a shoreside supporting framework and by buckets supported on an endless chain, likewise supported from shoreside framework, and which deliver the material onto conveyors.

A difficult problem which is encountered in barge unloading is to control the buckets or clam shells so that substantially all the material is removed from the barge and yet not damage the barge by striking it with the unloading equipment. The problem of control is complex because as the barge is unloaded, it rises. The buckets or clam shells must, therefore, be raised so as not to damage the barge. Presently, operators are employed to control the unloading equipment. Where tides are present, the foregoing problem is compounded because the tides serve to change the level at which the barge is initially presented to the unloading equipment. In all instances, rough waters make it difficult to completely unload the barge because, in general, no provisions are made to acommodate for tilt or roll of the barge.

It is a general object of the present invention to provide an improved barge unloading device.

It is another object of the present invention to provide a barge unloading device in which the supporting framework for the apparatus is carried on floating pontoons.

It is another object of the present invention to provide an apparatus in which the unloading means engages the barge to move in unison with the barge as it lifts, rolls and tilts.

It is still a further object of the present invention to provide a barge unloading apparatus which includes a bucket wheel serving to remove the material from the barge and to deliver the same onto a transfer conveyor for carrying the material away from the barge.

The foregoing and other objects of the invention will become more clearly apparent from the following description when taken in conjunction with the accompanying drawing.

Figure 1:
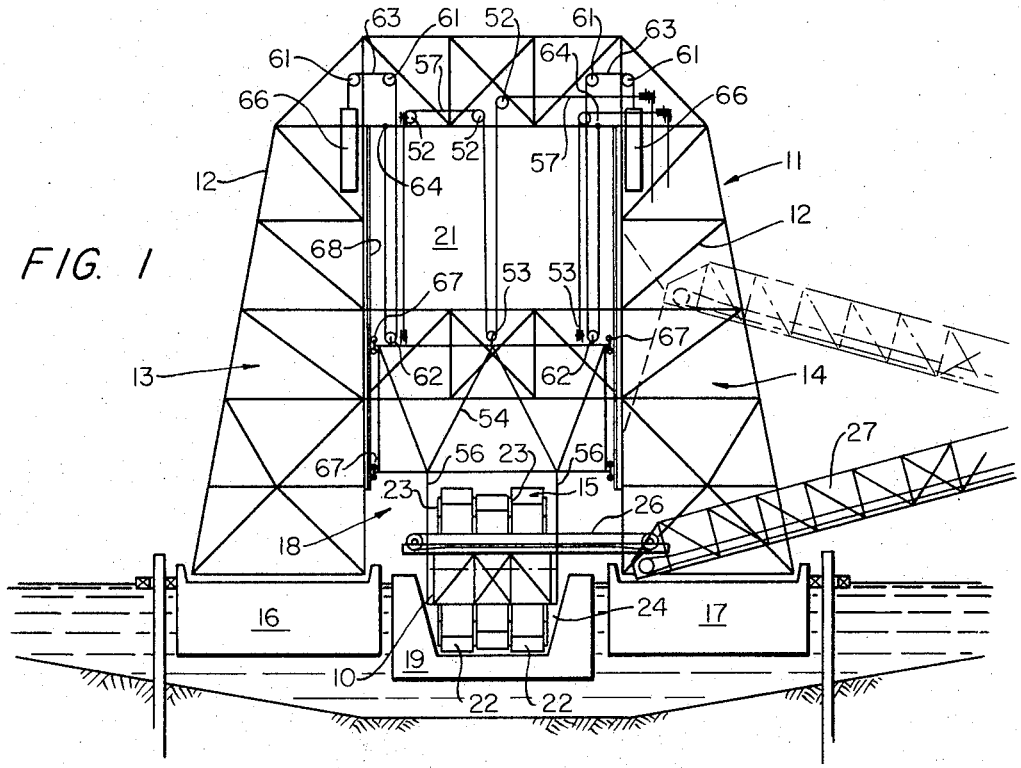
Figure 2:
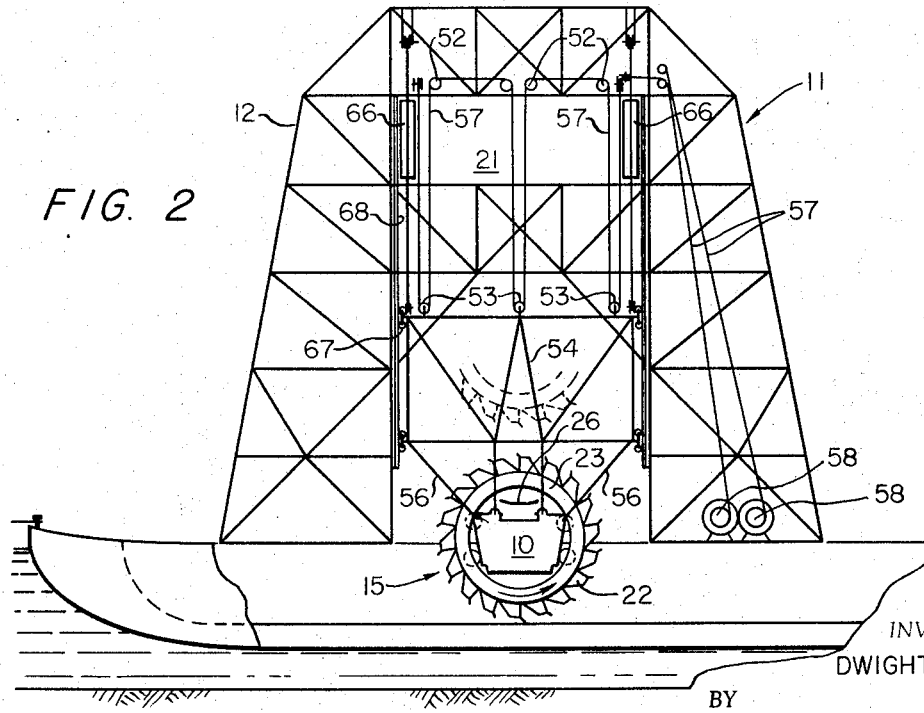
Figure 3:
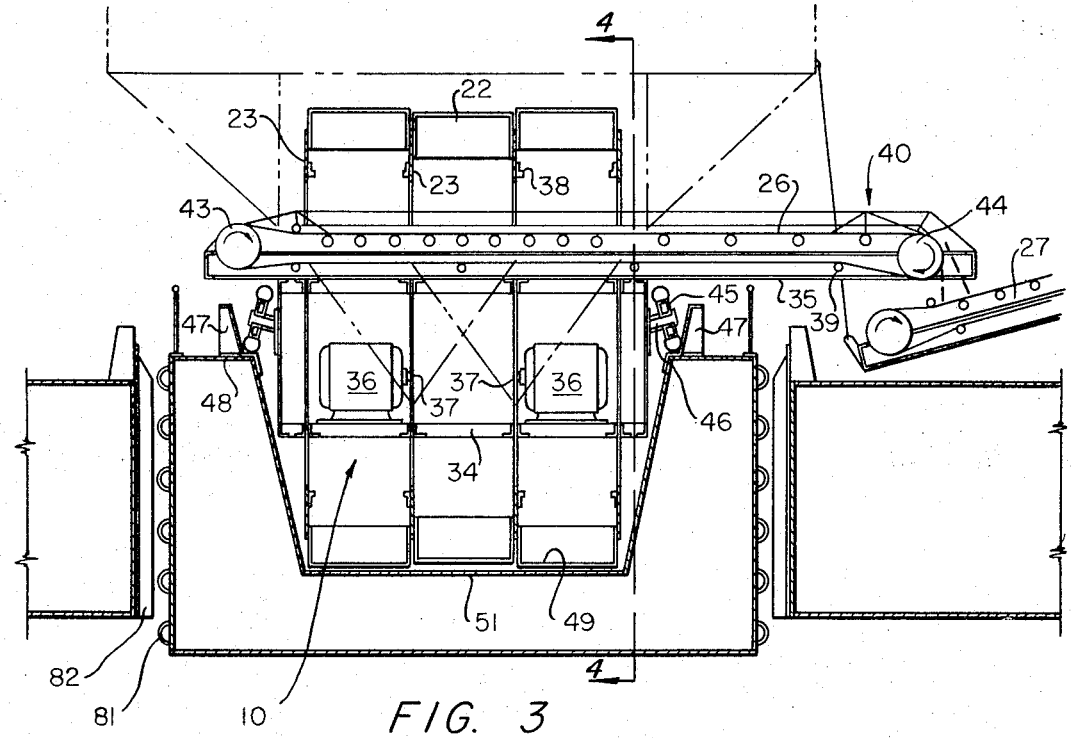
Figure 4:
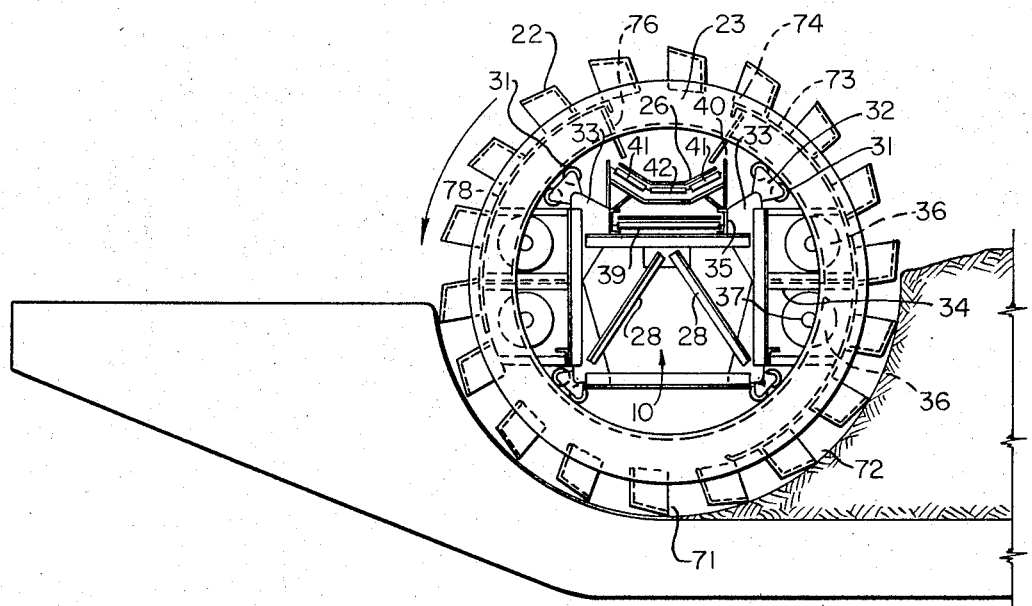
Figure 5:
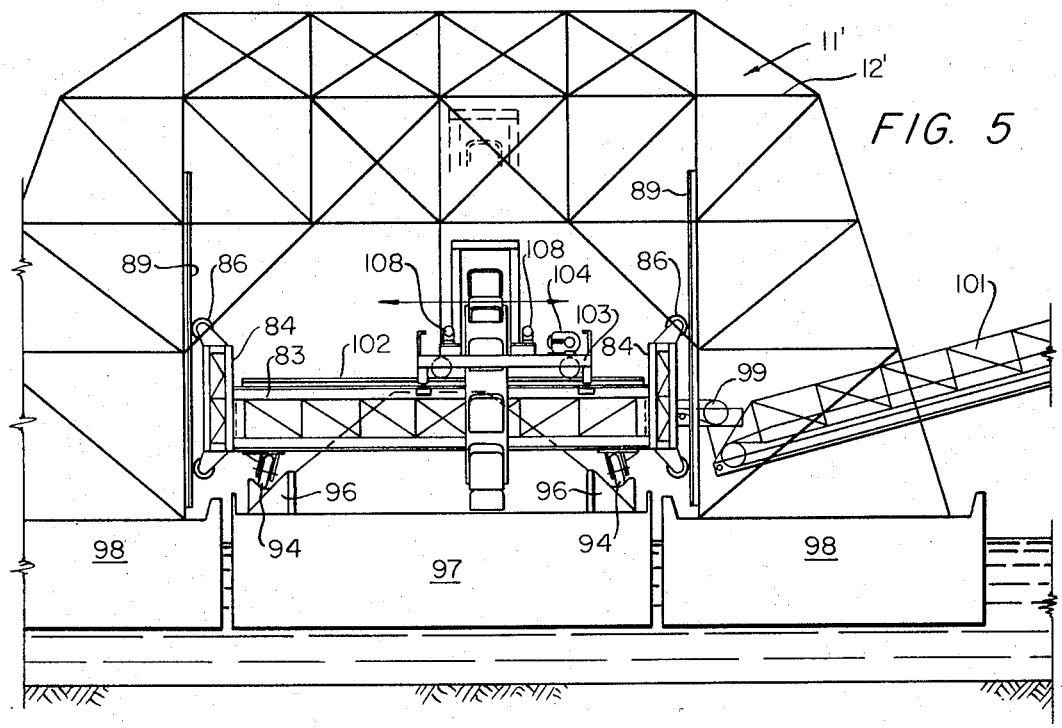
Figure 6:
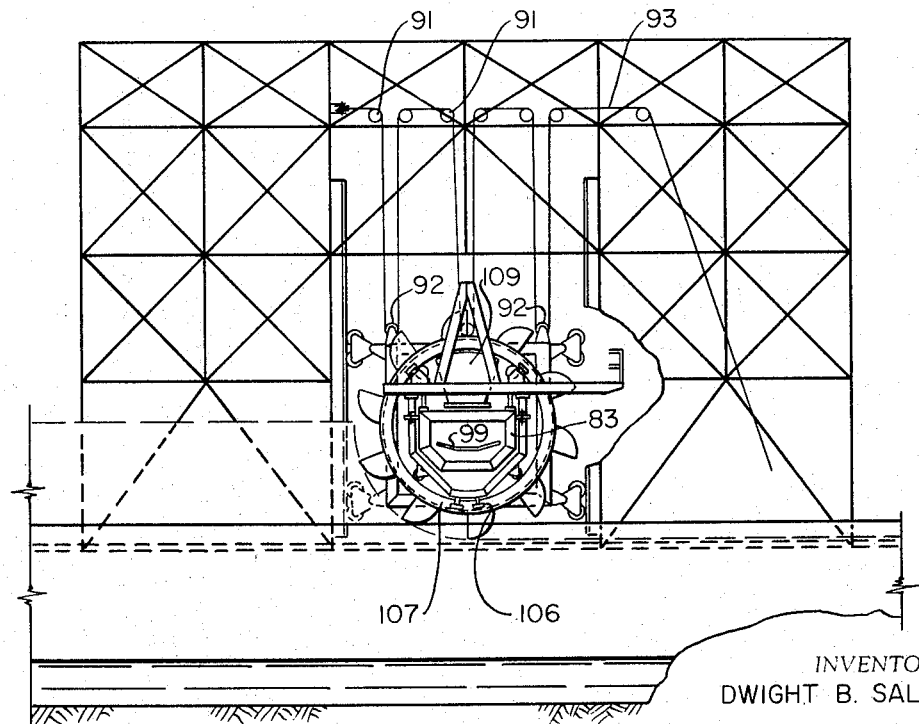
Figure 8:
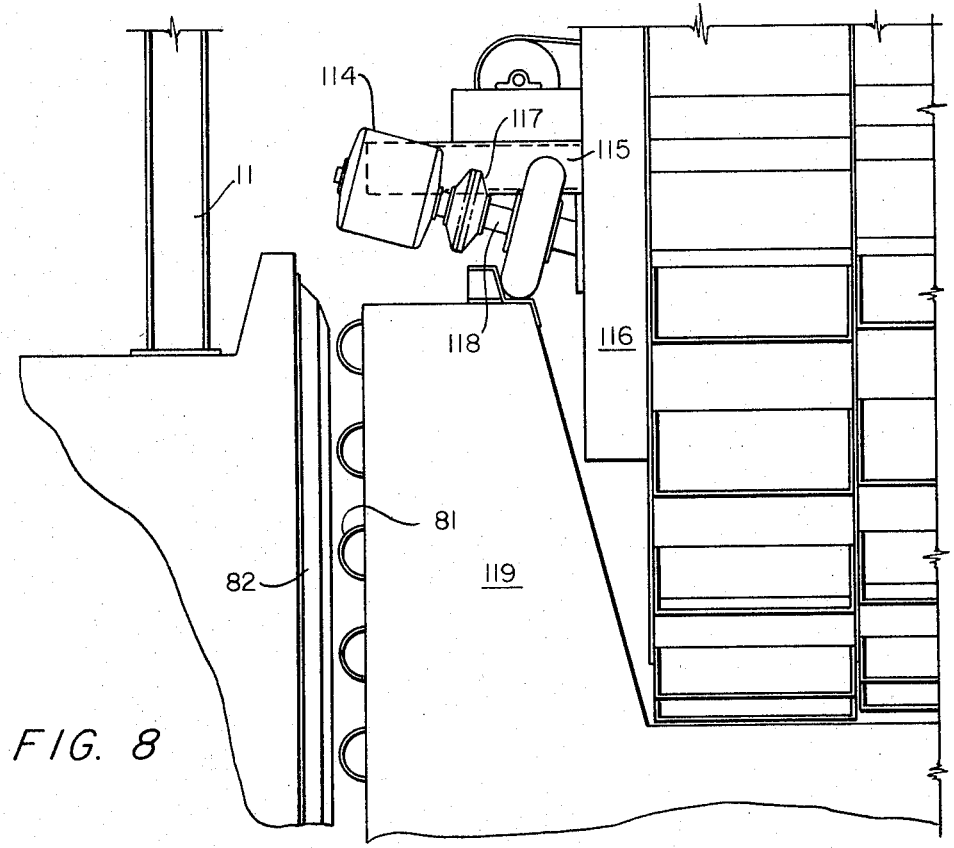
Figure 7:
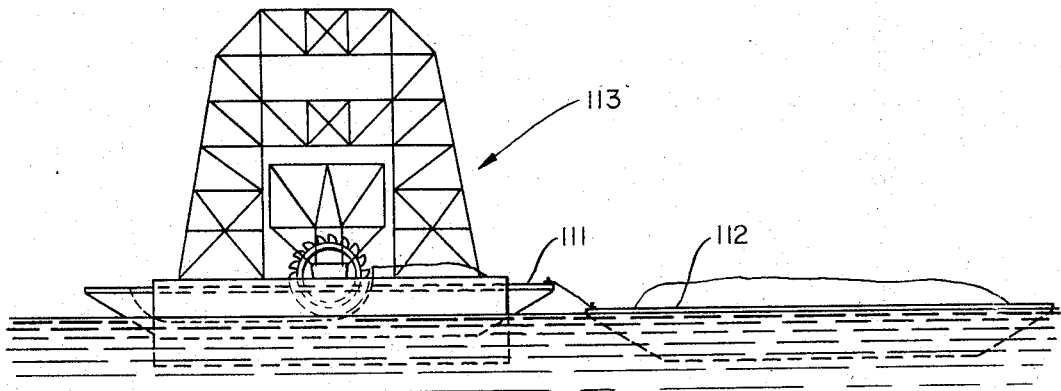

Referring to the drawing:
FIGURE 1 is a front elevational view of a barge unloading device showing a barge in unloading position;
FIGURE 2 is a side elevational view of the barge unloading device of FIGURE 1;
FIGURE 3 is an enlarged view showing in more detail the barge unloading wheel shown in the apparatus of FIGURES 1 and 2;
FIGURE 4 is a sectional view taken along the lines 4—4 of FIGURE 3;
FIGURE 5 is a front elevational view of another barge unloading apparatus incorporating a modified type of bucket wheel;
FIGURE 6 is a side elevational view of the apparatus shown in FIGURE 5;
FIGURE 7 illustrates a hauling and unloading operation; and
FIGURE 8 shows an unloading device which includes means for drawing a barge therethrough.

Generally, the barge unloading apparatus of the present invention includes a truss which is adapted to float on pontoons and straddle a barge to be unloaded. A bucket wheel is supported on a carriage for vertical movement within the truss whereby it may be lowered into cooperation with the barge to unload the material onto a conveyor. The carriage is positively indexed to the barge by engaging the deck of the barge. Thus, the carriage moves with the barge as it buoys upwardly during unloading. The carriage also tilts and rolls with the barge. This positive indexing assures accurate locating of the bucket wheel with respect to the bottom and sides of the barge. Since the truss is supported on pontoons which float with the barge, tides will not affect the relative level of the barge and unloader. Only changes in elevation of the barge due to changes in draft need be accommodated by the unloading device.

Referring to FIGURES 1 and 2, there is shown a truss 11 which includes a framework of members 12 which supports the carriage 10 and bucket wheel 15 for vertical movement as will be presently described. The truss 11 has downwardly depending legs 13 and 14, which are mounted on pontoons 16 and 17. Thus, the truss is floated on pontoons. The downwardly depending legs 13 and 14 define a so-called tunnel 18 which accommodates a barge 19 for unloading. A well 21 is formed in the truss above the tunnel 18. The well accommodates the carriage and wheel when they are in their retracted position.

As schematically shown in FIGURES 1 and 2, the bucket wheel 15 includes a plurality of buckets 22 arranged on the periphery of spaced rings 23 which ride on bearings, to be presently described. The wheel is rotated by suitable means as, for example, motors which engage ring gears. The width of the bucket wheel is substantially equal to the width of the cargo receiving space 24 whereby all of the material in the barge is removed in one longitudinal pass of the barge.

The bucket wheel 15 lifts the material from the barge and dumps it into conveyor 26 which conveys the material to an articulated conveyor 27 movable to deliver material in any desired direction with respect to the truss.

An unloading operation comprises bringing a barge under the truss; lowering the carriage 10 and bucket wheel 15 at the front of the barge; moving the barge forward as the bucket wheel is operated until the rear of the barge is reached; and lifting the carriage and bucket wheel so that the barge can be removed.

Referring now more particularly to FIGURES 3 and 4, carriage 10 includes a supporting framework comprised of a plurality of members 28. The carriage extends through and supports the bucket wheel 15, conveyor 26 and drive means for driving the bucket wheel.

As previously described, the bucket wheel comprises a plurality of buckets 22 arranged between rings 23. The inner peripheral surface of the ring engages spaced rollers 31 carried by a bracket 32 secured to plate 33 carried by carriage 10. The carriage supports brackets 34 which support drive means 36, with each means including a pinion gear 37 which engages an associated ring gear 38 carried on the rings 23 to rotate the bucket wheel.

Spaced longitudinal channels 35 are carried on the carriage and are adapted to support a conveyor frame 40. Lower rollers 39 are rotatably mounted between the spaced channels and support the return flight of the conveyor belt. The upper flight of the conveyor belt is cupped as shown more clearly in FIGURE 4 and is supported by angularly disposed side rollers 41 and central roller 42, all of which are rotatably mounted on brackets secured to the carriage framework. Beside the plurality of support rollers, there is provided turn-around rollers 43 and 44. One of the rollers, for example, roller 44, may be driven to move the belt and deliver material from the bucket wheel to the associated articulated conveyor 27.

The means for indexing the carriage to the barge comprises indexing wheels 45 carried on angularly disposed shafts 46 supported from the end of the carriage framework. The indexing wheels 45 include a pneumatic tire to provide a resilient engagement. When the carriage is lowered into an operating position as shown in FIGURES 1–4, the indexing wheel 45 engages a longitudinal guide rail 47 carried by the barge deck 48. The guide rail 47 serves to guide the barge as it is moved through the truss. More particularly, however, the wheels 45 engaging the guide 47 serve to accurately index the carriage with respect to the barge whereby the lower edges 49 of the buckets are accurately spaced from the bottom of the barge 51.

Means for lifting the carriage and associated equipment may comprise space sheaves 52 mounted on the truss framework and spaced sheaves 53 mounted on a carriage lifting framework 54. Suitable supporting means, for example, cables 56, extend downwardly from the supporting frame 54 to support the carriage therefrom. Cables 57 extend over the sheaves and extend over and are reeled on winches 58. Operation of the winches 58 serves to lift and lower the carriage.

In order to minimize the amount of weight which must be lifted and also the weight which must be carried by the barge when the carriage is in engagement therewith, there is provided a counter-balance system which includes spaced sheaves 61 carried on the truss framework, and a sheave 62 carried on the carriage lifting framework. A cable 63 extends over the sheaves 61 and 62. One end 64 is affixed to the framework and the other end of the cable is secured to a counterweight 66. The counterbalanced carriage supporting framework is guided in its vertical travel by means of spaced rollers 67 which engage spaced vertical rails 68.

In the lowered position of the carriage, the indexing wheels are in engagement with the barge. Raising of the barge during unloading will merely serve to lift the carriage which is relatively light because of the counterweight arrangement. Tilting and rolling movement is accommodated by tilting and rolling movement of the carriage.

Referring particularly to FIGURE 4, the bucket wheel rotates counter-clockwise. Material is picked up by the wheel at the bottom and front sides 71 and 72, respectively. The material is held in the buckets which have an open back by a stationary shield 73 which forms the back wall of the buckets as they are moved upwardly in cooperation therewith. The shield is terminated at 74. As each bucket moves past the end of the shield, the material contained therein falls downwardly into the chute 76 and onto the conveyor belt 26 where it is conveyed outwardly from the wheel as previously described.

A shield 78 is placed on the other side of the wheel to deflect any material which might be retained by the buckets.

The barge is guided through the spaced pontoons which support the framework by means of longitudinal metal bumpers 81 which engage vertical bumpers 82 carried by the pontoons. This provides relatively low friction guiding surfaces.

The apparatus described above includes a bucket wheel which has a width substantially equal to the width of the barge. In certain types of top loading barges, it may be desirable to provide a relatively narrow bucket wheel. In such instances, the bucket wheel is mounted for traversing movement back and forth across the barge as the barge is moved longitudinally therethrough.

Such a modified device is illustrated in FIGURES 5 and 6. The barge unloading device includes a truss 11' including a framework 12'. A relatively long carriage 83 is carried between trucks 84. The trucks include rollers 86 which engage vertical rails 89 to guide the carriage during movement. Cable means including spaced sheaves 91 carried by the truss and spaced sheaves 92 carried by carriage 83 and the cable 93 passing thereover serve to lift and lower the carriage.

Barge engaging and guiding wheels 94 are carried by the carriage 83 and are adapted to engage longitudinal guides 96 carried on the upper deck of the barge 97. As before, the barge 97 may include rails or bumpers which engage like bumpers on the pontoons 98 for further guiding of the same.

The carriage 83 is adapted to support a conveyor assembly 99 which receives material from the bucket wheel and deliver the same to an articulated conveyor assembly 101.

Spaced rails 102 are carried on the carriage 83 and are adapted to receive and guide wheeled trolley 103 for longitudinal movement along the carriage. Motive means 104 drive the trolley on the rails 102.

The trolley includes means for rotatably supporting a bucket wheel. Such means may comprise guide rollers 106 carried on the framework and adapted to engage spaced rings 107 which carry the buckets. Motive means 108 engage ring gears on the bucket wheel and serve to drive the wheel. As viewed in FIGURE 6, the wheel is rotated clockwise and lifts material past a crown sheet (not shown) and dumps the same into a chute 109 where it is directed onto conveyor belt 99.

In operation, a barge is placed under the apparatus; and the carriage 83 is lowered until the wheels 94 engage the associated rails 96 to accurately index the bucket wheel with respect to the barge. The motors 104 and 108 are then energized to rotate the wheel and cause the trolley to move along the rails 102. Material is removed as the wheel moves from one side to the other. Reversing means (not shown) are provided whereby to reverse the direction of travel of the trolley as it reaches the ends of the rails. As the wheel moves, the barge is moved longitudinally whereby material is progressively removed in a zigzag or scanning operation.

The bucket wheel is accurately located with respect to the barge and is adapted to move in unison therewith under raising, tilting, rolling or other movements of the barge.

Referring to FIGURE 7, there is schematically shown a train of barges 111 and 112 being presented to an unloading device 113 of the type described. Thus, it is seen that the operation may be a continuous type operation. As one barge is being unloaded, a tug may bring another barge and secure the same to the barge being unloaded. When the first barge is unloaded and the carriage lifted, the barge may be removed and the second barge positioned for unloading.

In the embodiments shown, the barges are longitudinally moved through the truss by means of a winch (not shown) which is suitably mounted in front of the truss. Alternatively, a tug may tow the barge through the truss. Still another alternative is to provide a barge driving means on the carriage to engage and drive the barge through the truss. For example, the indexing wheels may be driven wheels whereby the indexing wheels not only serve to index or locate the carriage and bucket wheel with respect to the barge, but also to urge the barge longitudinally through the truss. A driven indexing wheel is schematically shown in FIGURE 8. A motor 114 is mounted on a bracket 115 secured to the carriage 116. A clutch means 117 is provided between the motor shaft and the wheel shaft 118 to drive the wheel. By energizing the motor 114, the barge 119 is urged forward by driving action of the indexing wheel.

Thus, it is seen that there has been provided an improved barge unloading device. The device includes a floating truss which rises and falls with the tide. A carriage is carried for vertical movement by the truss and is positively indexed to an associated barge to float therewith thereby to accommodate any changes in draft, tilt or roll of the barge. The apparatus is simple in construction and is movable from one location to another in a body of water.

I claim:

1. A barge unloading device for unloading material carried by barges comprising a carriage, a bucket wheel rotatably supported on said carriage for removing material from a barge, a conveyor supported on said carriage in cooperation with said bucket wheel to receive material therefrom and deliver the material, a truss, means cooperating between said truss and said carriage for raising and lowering the carriage, and means secured to said carriage adapted to cooperate with a barge being unloaded for indexing the carriage with respect to the barge and for allowing said barge to at least partially support said carriage whereby said carriage moves in unison with said barge as it tilts, rolls and raises.

2. A barge unloading device as in claim 1 wherein said truss includes spaced depending legs and pontoons adapted to engage said legs to float the truss.

3. A barge unloading device as in claim 1 wherein said means cooperating with the barge for indexing the carriage comprises wheels adapted to engage guides on said barge to thereby permit longitudinal movement of the barge.

4. A barge unloading device as in claim 1 in which said carriage includes means for driving the barge longitudinally past the bucket wheel.

5. A barge unloading device as in claim 1 wherein said bucket wheel has a width substantially equal to the width of the barge hold to empty the barge in one longitudinal pass.

6. A barge unloading device as in claim 1 in which said bucket wheel has a width substantially less than the width of the barge, a trolley for rotatably carrying said wheel, rails mounted on the carriage adapted to receive and guide said trolley for movement along said carriage whereby the bucket wheel traverses across the barge as the barge is longitudinally moved.

7. A barge unloading device as in claim 1 including guide means for guiding the carriage in its vertical movement.

References Cited
UNITED STATES PATENTS

| | | | |
|---|---|---|---|
| 1,058,306 | 4/1913 | Kindl | 214—14 |
| 3,062,392 | 11/1962 | Eppard | 214—14 |
| 3,104,766 | 9/1963 | Sasadi | 214—14 |

ROBERT G. SHERIDAN, *Primary Examiner.*